(No Model.)
F. WILKIE.
IMPLEMENT FOR CUTTING PEARL, &c.
No. 484,075. Patented Oct. 11, 1892.
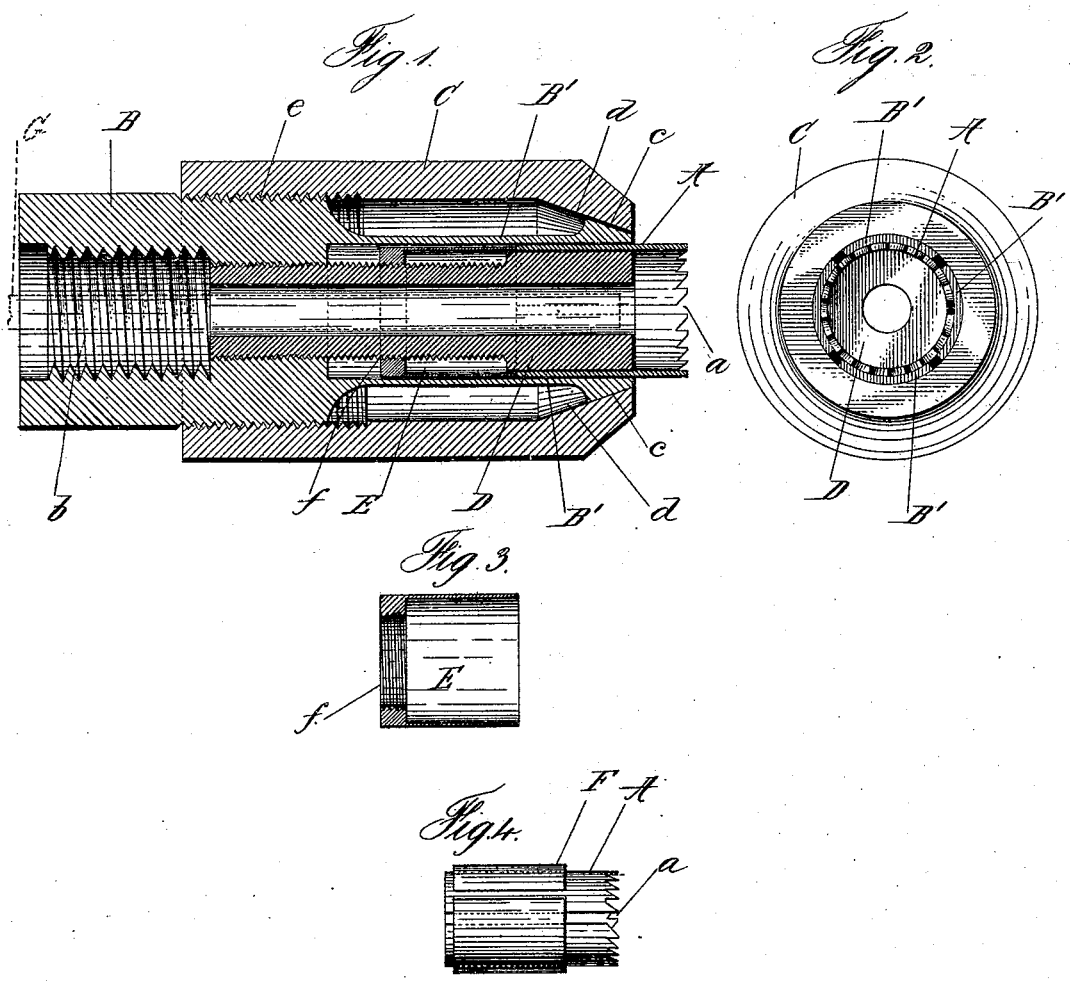
WITNESSES:
John Buckler,
L. H. Osgood
INVENTOR
Frederick Wilkie,
BY
Worth Osgood,
ATTORNEY

UNITED STATES PATENT OFFICE.

FREDERICK WILKIE, OF NEW YORK, N. Y.

IMPLEMENT FOR CUTTING PEARL, &c.

SPECIFICATION forming part of Letters Patent No. 484,075, dated October 11, 1892.

Application filed March 24, 1892. Serial No. 426,201. (No model.)

*To all whom it may concern:*

Be it known that I, FREDERICK WILKIE, of New York city, county and State of New York, have invented certain new and useful Improvements in Implements for Cutting Pearl, &c., of which the following is a full, clear, and exact description, reference being had to the accompanying drawings, and to the letters of reference marked thereon.

My invention relates to implements employed for cutting pearl and various other substances, such as are used in the manufacture of buttons and articles of a like general character or contour.

Among the objects of my invention are the provision of a simple, cheap, accurate, durable, and effective implement of easy application and use, involving an adjustable revolving cutter and means for securely clamping and gaging the same, to provide for the advancement of the cutter as it is worn away, and for admitting of the rapid and accurate seating of a new cutter as occasion may require.

To accomplish these objects and to secure other and further advantages in the matters of construction, operation, and use, my improvements involve certain new and useful arrangements or combinations of parts and peculiar features of invention, as will be herein first fully described, and then pointed out in the claims.

In the drawings, Figure 1 is an axial section and elevation of my improved implement with one size of cutter in place and ready for application upon the spindle of any lathe or other turning-machine; and Fig. 2 is a corresponding end elevation of the same, looking toward the cutter. Fig. 3 is a sectional elevation of the abutting nut detached from other parts, which is sometimes employed to prevent the cutter from being forced backward. Fig. 4 is a view in elevation illustrating the manner of adapting cutters of the smaller diameters for use in the same chuck, intended to take, also, those of greater diameters.

In all these figures like letters of reference, wherever they occur, indicate corresponding parts.

A represents the cutter, which is a hollow cylinder of steel or other suitable material of requisite hardness and elasticity, the same being provided on its cutting-face with teeth of desired size and shape and being slitted or open along its length, as indicated at $a$. The material (whatever it may be) to be cut is forced against the cutter or the cutter against the material, while the cutter is made to revolve rapidly. As the teeth or the cutting-surface wears away it may be renewed or sharpened, and the cylinder should be capable of being thus used until it becomes too short to be firmly held. The cutter should be so secure in its mounting that any force brought upon the work cannot crowd it backward, and uniformity in the size of the disks which result from the cutting should be maintained within reasonable limits, the more uniform the better, as is manifest.

B is the base of the clutch, fitted for connection with the lathe-spindle, as by a thread or winding $b$. The forward part of this base is provided with a number of spring-arms, (shown at $B' B'$,) which are preferably formed continuous with the base and which are intended to clamp the cutter-cylinder. The extremities of these arms are inclined, as shown at $c$, and they are forced toward each other and held by a sleeve C, correspondingly inclined, as at $d$, and threaded upon the base-piece, as at $e$. By tightening the sleeve the cutter is held at the point to which it has been adjusted, as will be seen.

In the center of the clutch is a plug D, having a shank which is threaded and which enters the base-piece. The outer portion of this plug is turned to the size or diameter required for the inside of the cutters, and it determines the size to which the cutters are to be brought, and is hence denominated a "sizing-plug."

As shown in Fig. 1, the cutter is slipped upon the sizing-plug and is then brought firmly into contact therewith by suitably turning the sleeve C. All cutters used with the same plug are thus brought accurately to the same internal diameter. The clamping thus provided for will in many cases alone suffice to hold the cutter against backward movement; but for the heavier work and for greater security I provide an abutting nut E. (Shown in Figs. 1 and 3.) This may be made by drilling a bit of steel to the form shown in Fig. 3 and threading it, as at $f$, to fit the thread upon the shank of the sizing-plug. Before the sizing-plug is adjusted in the clutch the abutting nut is adjusted upon the shank of the plug. The shell of the nut rides upon the turned surface of the plug and in the space between it and the clamping-arms, but is not so thick as to interfere with the clamping. The cutter abuts against the end of the shell and cannot then be forced back. When the cutter wears away, it must be advanced. At the same time the abutting nut is advanced, and thus the security of the cutter is insured until it is nearly worn away, resulting in economy in the use or consumption of the cutters.

When it is desired to use a larger cutter than that shown in Fig. 1, for instance, the sizing-plug of appropriate dimensions, and, if desired, the abutting nut, is introduced, the sleeve C turned forward, and the cutter applied and clamped, as before.

To employ a smaller cutter, it is supplied with a split band, as shown at F, Fig. 4, the same being merely slipped in place upon the cutter. This cutter and band, being mounted upon the proper sizing-plug, are clamped by the spring-arms, the cutter being brought to a bearing, same as before. The band operates in effect to increase the outside diameter of the cutter, and by its use cutters of the smallest size may be employed in the larger-sized clutches, increasing the capacity of said clutches for various sizes and obviating the necessity of providing many clutches or changing them for small variations in the size of work to be cut. The effect of the cutter is of course to form a disk out of the material being worked, and this disk must be ejected. I have shown an ejector-pin in dotted lines at G, Fig. 1. Other means of ejecting the disks may of course be employed; but when this pin is used the plug must be made hollow.

The improved device, constructed substantially in accordance with the foregoing explanations, has been found to admirably answer all the purposes or objects of the invention previously indicated.

Having now fully described my invention, what I claim as new, and desire to secure by Letters Patent, is—

1. In an implement of the character herein set forth, a hollow cylindrical cutter slitted as explained, the same being mounted upon a corresponding cylindrical sizing-plug and combined with jaws, substantially as described, for compressing and holding the cutter upon the plug, for the purposes explained.

2. In an implement of the character herein set forth, a hollow cylindrical cutter, a sizing-plug for receiving said cutter, an abutting nut movable upon the shaft of the sizing-plug, and clamping-arms for holding the cutter, combined and arranged substantially as explained.

3. In combination with a hollow cylindrical cutter slitted as explained and mounted upon a cylindrical sizing-plug, a slitted band mounted upon said cutter and adapted to increase the external diameter thereof, and jaws for compressing the band and cutter upon the sizing-plug, substantially as and for the purposes set forth.

4. The herein-described sizing-plug, the same being threaded into the base part of the clutch and having the threaded shank for the reception of an abutting nut, the same being combined with an abutting nut, substantially as shown and explained.

5. The herein-described implement, comprising the clutch-base, spring clamping-arms, sizing-plugs, slitted cylindrical cutter, and adjustable sleeve, all mounted, arranged, and combined substantially as shown.

In testimony that I claim the foregoing I have hereunto set my hand in the presence of two witnesses.

F. WILKIE.

Witnesses:
W. J. MORGAN,
WORTH OSGOOD.